United States Patent [19]

Kelly, Jr. et al.

[11] 4,326,917
[45] Apr. 27, 1982

[54] METHOD OF NUCLEAR REACTOR CONTROL USING A VARIABLE TEMPERATURE LOAD DEPENDENT SET POINT

[75] Inventors: Joseph J. Kelly, Jr.; George E. Rambo, both of Lynchburg, Va.

[73] Assignee: The Babcock & Wilcox Company, New Orleans, La.

[21] Appl. No.: 80,977

[22] Filed: Oct. 2, 1979

[51] Int. Cl.³ .............................................. G21C 7/00
[52] U.S. Cl. .................................. 376/216; 376/217; 376/210
[58] Field of Search ..................... 176/20 R, 22, 24

[56] References Cited

U.S. PATENT DOCUMENTS 3,423,285  1/1969  Curry ................................. 176/24
4,061,533  12/1977  Durrant ............................. 176/24

Primary Examiner—Donald P. Walsh
Attorney, Agent, or Firm—Vytas R. Matas; Robert J. Edwards

[57] ABSTRACT

A method and apparatus for controlling a nuclear reactor in response to a variable average reactor coolant temperature set point (79) is disclosed. The set point (79) is dependent upon percent of full power load demand. A manually-actuated (85) "droop mode" of control is provided whereby the reactor coolant temperature is allowed to drop below the set point (79) temperature a predetermined amount wherein the control is switched from reactor control rods exclusively to feedwater flow.

11 Claims, 2 Drawing Figures

METHOD OF NUCLEAR REACTOR CONTROL USING A VARIABLE TEMPERATURE LOAD DEPENDENT SET POINT

TECHNICAL FIELD

The present invention generally relates to nuclear reactor control methods and particularly to such methods wherein the control is accomplished in response to a variable temperature set point which is a function of load demand.

BACKGROUND ART

Nuclear control systems for pressurized water reactors are known which are based on average reactor coolant temperature as a set point. These known control systems utilize either a constant average temperature set point or a set point which increases with increasing reactor power. Control of the average temperature to the set point is by reactor control rod movement and/or changes in the boron concentration in the reactor coolant. Rapid power changes have historically depended upon full length control rod motion for reactivity addition and upon partial length control rod motion for power distribution control within the reactor. However, the large changes in linear heat rate experienced by reactor fuel rods in the vicinity of the control rods, particularly those near the partial length control rods, have led to recent concerns about fuel cladding integrity in light of a phenomenon known as pellet-clad interaction.

It is well-known that reactor operation with the partial length control rods totally removed from the reactor reduces the risk for pellet-clad interaction but at the same time restricts the maneuvering capability of the reactor based on full length control rods because there is no readily available method of controlling large power imbalances within the core. Rapid power changes utilizing changes in boron concentration, while possible would require very expensive hardware modifications to existing reactor designs and would substantially increase the radioactive waste processing requirements.

Because the reactor coolant has an inherent negative moderator coefficient, methods of achieving positive reactivity addition and fast power increases by decreasing the average reactor coolant temperature are known. However, all the known methods employ a temperature drop below a set point which normally increases with power which is the standard control mode for nuclear plants with recirculating steam generators.

What was needed was a control system which would allow large power load changes at rates up to five percent full power per minute and which could be implemented at a reasonable cost in conjunction with deletion of the partial length control rods from the existing design of a nuclear reactor system utilizing once-through steam generators.

SUMMARY OF THE INVENTION

The present invention is a specific method of combining known temperature set point control concepts employing constant average temperature, dropping average temperature, and constant reactor coolant outlet temperature into a single control concept which yields significantly greater benefits on plants employing once-through steam generators than any of the individually known temperature control methods. The invention solves the problems associated with the prior art devices as well as others by providing a method and apparatus for nuclear reactor control which allows reactor power changes at ramp rates up to five percent full power per minute while minimizing waste bleed volumes and pellet-clad interaction concerns for fuel integrity.

To accomplish this, a variable average reactor coolant temperature set point is provided which is made a function of the power load demand requirements. This variable set point is made to have a constant temperature set point over the middle portion of the power load range and provides a gradually decreasing temperature set point at the high power end of the power load range. The control of the reactor in response to this variable set point is automatic and done by control rod motion. The programmed average reactor coolant temperature provides moderator temperature reactivity benefits which significantly reduce control rod motion and the need to change boron concentration during maneuvering at high power levels.

To meet large power change requirements at rates up to five percent full power per minute, a manual "droop mode" of control is provided wherein the temperature of the reactor coolant is allowed to drop below the forementioned set point within predetermined limits. During this manually-actuated control function, the power requirements are met by varying the feedwater flow to the steam generator to drop the reactor coolant temperature and thereby increase the reactivity of the reactor. Utilizing this mode of control further minimizes control rod motion and boron concentration change requirements while meeting power load demands at rates up to five percent full power per minute.

In view of the foregoing, it will be seen that one aspect of the present invention is to provide a method and apparatus for nuclear reactor control utilizing a variable set point which is a function of power load demand and has a constant temperature at the mid range of power load and a decreasing temperature at the high range of power load.

Another aspect of the present invention is to provide a manual nuclear reactor control which is based exclusively on feedwater flow and allows high power demand changes with less boron concentration change than would otherwise be required.

These and other aspects of the present invention will be more clearly understood upon a review of the foregoing description of the preferred embodiment when considered with the accompanying drawings.

DESCRIPTION OF THE PREFERRED EMBODIMENT

Figure 1:
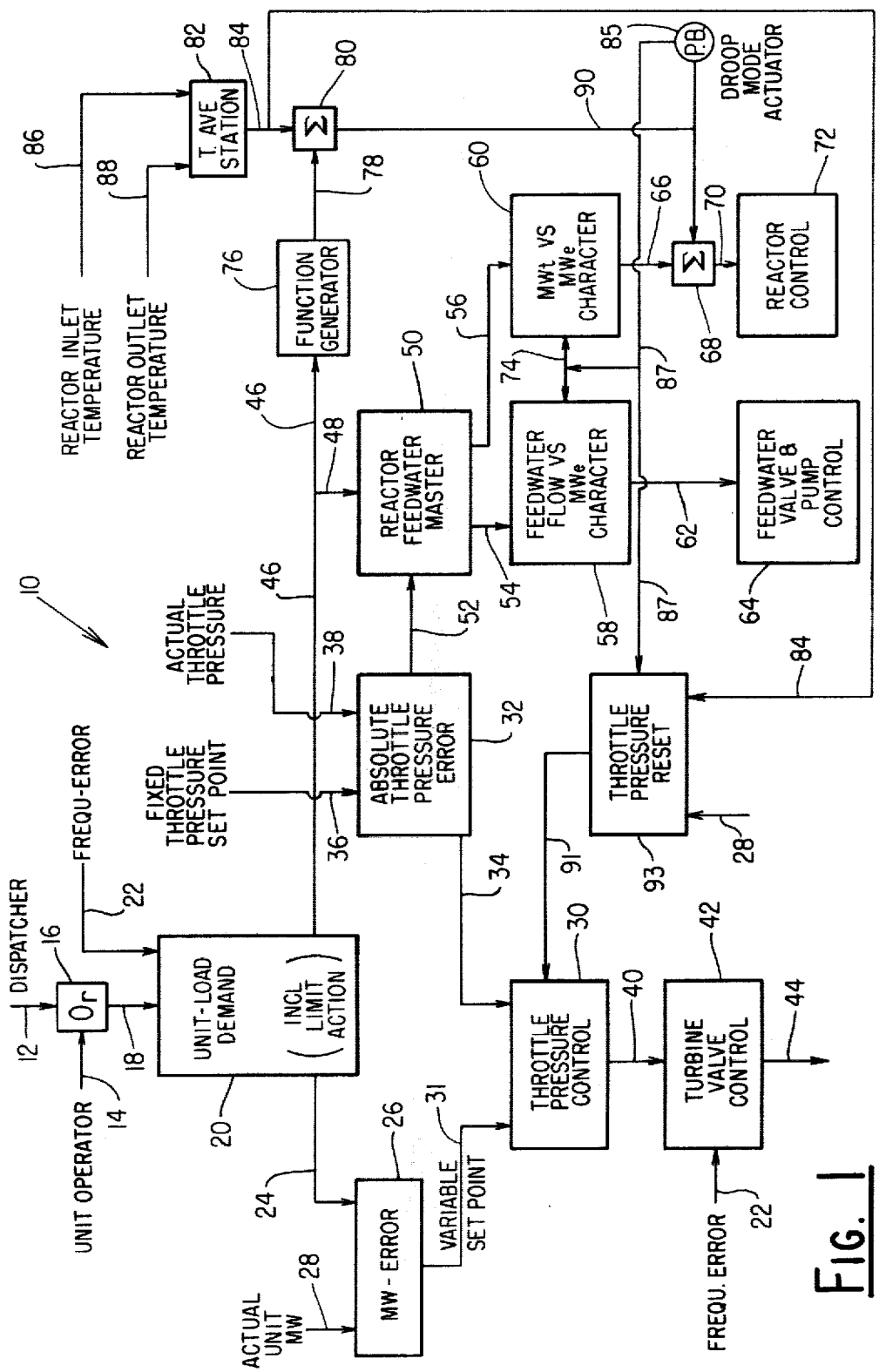
FIG. 1 is a schematic of the control system utilizing the variable temperature set point of the present invention.

Referring now to the drawings wherein the showings are for purposes of disclosing a preferred embodiment of the invention and are not intended to limit the invention thereto, FIG. 1 shows a basic block diagram of a control system 10 utilizing the variable temperature set point and the manual "droop mode" control of the present invention.

The control system 10 is connected to an automatic dispatch system through a control line 12 which dispatch system automatically provides indications of desired load demand changes. These control signals from the automatic dispatch system are typically in terms of a logic load increase contact closure, a logic load decrease contact closure, or a logic zero. The percent of reactor load demand change is dependent upon the number of contact closures or pulses. Typically, the pulse duration must be one-half millisecond or greater and equivalent to about one megawatt. The control system 10 may also have manually-inputed percent load demand changes through a control line 14 which is under the control of the plant operator who sets the load demand target. Both the control lines 12 and 14 go to an OR-GATE 16 which passes the manual control signal from line 14, when such a signal appears, to the exclusion of the signal from the automatic dispatch system 12. In either case, the target load input is inputed along line 18 to a unit load demand module 20.

A turbine-generator frequency error signal is also inputed to the unit load demand module along line 22. This frequency error signal is not intended to perform the primary control but rather acts to anticipate and thus support the traditional frequency control function of the turbine-generator.

The unit load demand module converts the load demand signals inputed along line 18 and the frequency error signal 22 into an electrical megawatt demand signal and outputs that signal along line 24 to a megawatt summing station 26. This station compares the desired megawatt signal from line 24 with the actual reactor megawatt output measured and provided from line 28 and develops an error signal which is inputed to a throttle pressure control module 30 along line 31. The throttle pressure control module 30 also receives an input signal from an absolute throttle pressure error module 32 along line 34. The absolute throttle pressure error module compares the fixed throttle pressure set point inputed along line 36 with the actual throttle measured pressure signal inputed along line 38 and sends the error signal between this comparison to the throttle pressure control module 30 along line 34. The output of the comparison between the megawatt error signal inputed along line 31 and the throttle pressure error signal inputed along line 34 is then forwarded along line 40 to a turbine valve control module 42 which combines the formentioned signal with the turbine-generator frequency error signal from line 22 to provide a control signal along line 44 which is used to position the turbine valves by well-known positioning devices which are not shown.

The electric signal indicative of megawatt load demand is also transmitted by the unit load demand module 20 along lines 46 and 48 to a reactor feedwater master comparison station 50. This module 50 receives a signal from the absolute throttle pressure error module 32 along line 52 and this signal is used as a correction for absolute throttle pressure error. The output of the reactor feedwater master control module 50 is sent along lines 54 and 56 to converting modules 58 and 60, respectively. The converting module 58 takes the electric signal indicative of megawatt requirements from line 54 and converts it to a pump speed and valve position signal outputting that signal along line 62 to feedwater valve and pump control positioners and speed controls indicated by the control system 64. Similarly, the conversion module 60 converts the megawatt signal indicative of load demand from line 56 to a control rod position signal along line 66 to a summing station 68, the output of which provides a control signal to the control rod actuating devices indicated at the control box 72 along line 70. There is a cross-limit communication provided between the conversion modules 58 and 60 along line 74 which provides alternate actuation depending on the limits reached by the individual modules 58 and 60.

Figure 2:
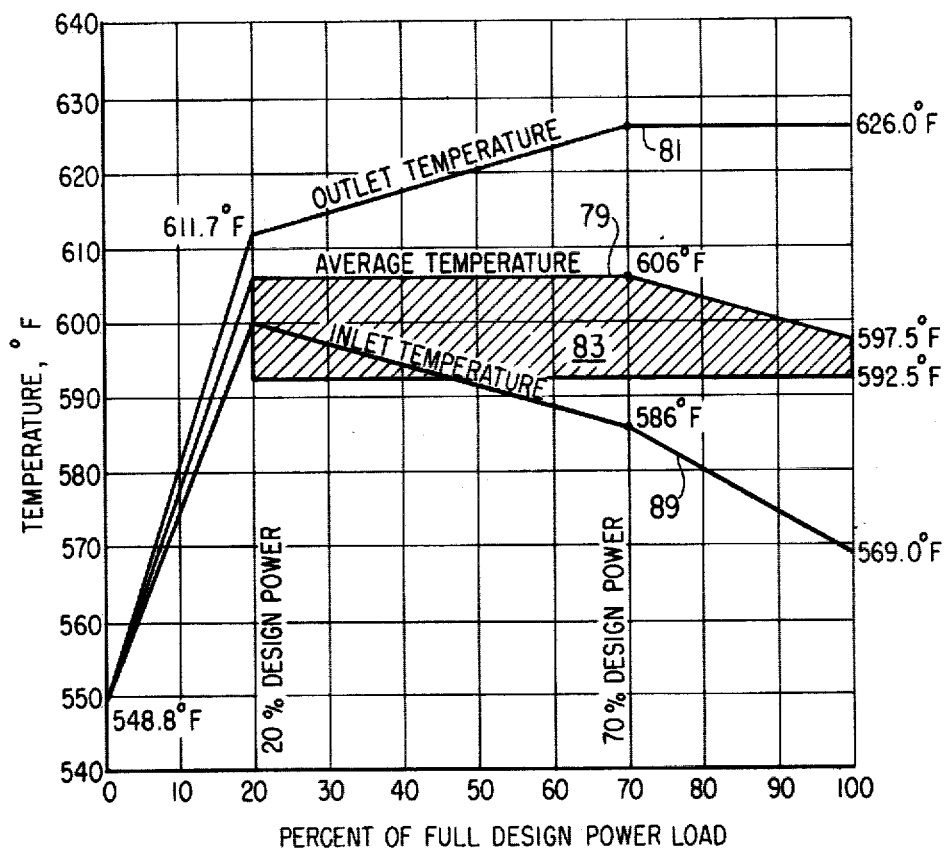
FIG. 2 is a chart detailing the functional relationship of the temperature set point to power load and the "droop" control area.

The unit load demand signal indicative of reactor megawatt requirements is also forwarded along line 46 to a function generator 76 which converts the power load requirements to a reactor coolant average temperature signal according to the graph 79 of the chart at FIG. 2. For purposes of this specification, the phrases "reactor vessel average temperature" and "reactor coolant average temperature" both mean the arithmetic average of the reactor coolant temperatures as measured by temperature sensing devices at the reactor vessel inlet and at the reactor vessel outlet. The reactor coolant average temperature set point signal which is dependent upon load, as per graph 79, is then transmitted along line 78 to a comparator 80 which compares the actual reactor coolant average temperature provided to the comparator 80 from the temperature averaging station 82 along line 84. The temperature averaging station 82 accepts actual measured temperatures from the reactor inlet along line 86 and from the reactor outlet along line 88 to provide the actual measured average temperature. The output of the comparator 80 is therefore an error signal which is indicative of any deviation between the reactor coolant average temperature set point which is load dependent, as per graph 79, with the actual reactor coolant average temperature. This error signal is transmitted along line 90 to the summing station 68 where it is used to modify the signal which controls the position of the reactor control rods through the reactor control module 72.

Before continuing with the manually-actuated "droop mode" of control, let us take a more detailed look at the automatic control of the reactor in response to the reactor coolant average temperature set point as shown by the curve 79 at FIG. 2. During power escalation from zero percent full power to 20 percent full power, the reactor coolant average temperature increases linearly from 548.8° F. to 606° F. Between 20 percent full power and 70 percent full power the reactor coolant average temperature is held constant at 606° F., 8.5° F. higher than the constant reactor coolant average temperature of 597.5° F. in the prior art constant temperature set point control reactors. The reactor coolant average temperature decreases linearly from 606° F. at 70 percent full power to the 597.5° F. temperature at 100 percent full power used for constant set point operations. Operation in this "normal" or automatic mode is along this described curve 79. The outlet temperature of the reactor coolant is determined by the reactor coolant average temperature and the feedwater flow rate, both of which are functions of reactor power demand such that the reactor coolant outlet temperature approximately follows the curve 81 and does not exceed the limit of 626° F. set for present reactors.

All controlled reactor power decreases and power increases at slow ramp rates are along the curve described at 79. Thus, the plant normally controls to a programmed value of reactor coolant average temperature which is a function of the unit load demand. The advantage of the "normal mode" of operation is that during power decreases, the programmed average temperature increase operates to reduce the required rod insertion or boration. During power increases, the programmed reactor coolant average temperature decrease reduces the required rod withdrawal or the need for deboration.

When it is desired to increase power of the reactor at faster ramp rates (up to five percent full power per minute), the control rods of the reactor would be withdrawn with the reactor coolant average temperature following along the curve 79, either until the control rods are completely withdrawn or until an administratively imposed core power distribution limit such as imbalance restricts further rod withdrawal. Once the control rod withdrawal limit is reached, the cross-limits imposed by the control system 10 through the line 74 connecting the modules 58 and 60 put the control system 10 in track and prevent further increases in load demand. At such a time, the "droop mode" manual control can be utilized to continue to increase reactor power in response to the increasing unit load demand even though the control system 10 cannot withdraw control rods. In this mode, which will be described in detail later, feedwater continues to increase to match the increasing unit load demand and the reactor coolant average temperature is allowed to drop a predetermined amount below the average temperature set point defined by the curve 79. When the reactor coolant average temperature drops below the average temperature set point curve defined by the curve 79, the reactor vessel inlet and reactor vessel outlet temperatures drop by the same amount below their normal values defined by curves 81 and 89. The reactor operator may elect to place the control system 10 into this "droop mode" also during slower rates of power increase in order to reduce the bleed volumes associated with these transients.

The advantage of the "droop mode" of operation is that it allows an even greater temperature decrease and hence a greater positive reactivity addition due to the negative moderator temperature coefficient than is provided during power increases by operation in the "normal" or automatic control mode. The amount of drop below the programmed average temperature set point as defined by the curve 79 is as shown by the cross-hatched area 83 and has a lower limit of 592.5° F. Referring now to FIGS. 1 and 2, the operator initiates the "droop mode" by depressing pushbutton 85 which blocks the signal from line 90, which signal is indicative of the error between the variable set point of curve 79 and the actual reactor coolant temperature. A control signal from the "droop mode" actuator button 85 is also transmitted along line 87 to the cross-limit connection 74, which blocks the limit on feedwater so that the control system 10 can increase the feedwater in response to increasing unit load demand from the station 20 and will not be limited by the average temperature error signal as long as the reactor coolant average temperature does not decrease below 592.5° F. Normally, the cross-limits imposed by the connection 74 would block feedwater increase as the reactor coolant temperature average decreased below the temperature average set point. The cross-limits 74 when inhibited by the control signal along line 87, also inhibit the withdrawal of control rods, thereby preventing the control system 10 from trying to recover the reactor coolant average temperature to the set point by rod withdrawal. (Rod insertion is not inhibited.) Normally, the control rods would be fully withdrawn before initiating the "droop mode". This control rod withdrawal inhibit gives the system flexibility by allowing the operator to place the control system 10 in the "droop mode" and continue the power increase when further control rod withdrawal might cause core power distribution or imbalance limits to be exceeded. Rod withdrawal by the operator from the control rod drive station on the operator console, however, is not inhibited. Should the reactor coolant average temperature drop several degrees below the 592.5° F. limit, the control system 10 will automatically switch from the "droop mode" to the "normal mode" and recover the reactor coolant average temperature to its set point by reducing feedwater flow rate or withdrawing any control rods which are less than fully withdrawn. This automatic action is provided to protect the system from operator errors such as failure to restore the normal operation mode in a timely manner. The operator may reset the normal operation by resetting the pushbutton 85 whenever the reactor coolant average temperature is within 0.5° F. of the normal mode set point described as curve 79. This limitation is imposed to prevent the operator from initiating an undesirable transient as the control system 10 tries to recover reactor coolant average temperature to its set point value.

Temperature recovery to the set point may be achieved by either zenon burnout or deboration.

In the "droop mode" below 597.5° F., it may be necessary to reduce the turbine throttle valve pressure to preserve the desired margin of steam superheat at high power. This is achieved by a logic signal generated in throttle pressure reset module 93 and transmitted along line 91 to the throttle pressure control module 30. The inputs to the throttle pressure reset module 93 are the actual unit megawatt signal on line 28, the reactor coolant average temperature along line 84 and the "droop mode" logic signal along line 87. The module 93 reduces the throttle pressure 50 or 60 psi when the reactor coolant average temperature is less than 597.5° F. and reactor power in actual megawatts is greater than the megawatt rating at 90 percent full power and the "droop mode" is actuated.

The preferred embodiment of the invention was developed for implementation at reasonable cost on an existing design. Hence, specific numbers given in this specification are for implementation on that particular design and reflect existing limitations of that design and should not be construed to be limits on the control concept or system which we claim as our invention.

Certain modifications and improvements will occur to those skilled in the art upon reading this specification. It will be understood that all such improvements and modifications have been deleted herein for the sake of conciseness and readability but are properly covered within the scope of the following claims.

We claim:

1. A method of controlling the power output of a nuclear reactor comprising the steps of:
   providing a variable average reactor coolant temperature set point having a constant temperature portion and a decreasing temperature portion for controlling the reactor power by control rod movement;
   providing a control range of average reactor coolant temperatures below said variable temperature set point for controlling the reactor power in response to variable feedwater flow; and switching control between said variable coolant temperature set point and said control range of temperatures whenever a large change in reactor power output is required.

2. A method as set forth in claim 1 wherein said variable temperature set point is a function of reactor power demand.

3. A method as set forth in claim 2 wherein said variable temperature set point is constant over the middle portion of said reactor power demand and is linearly decreasing in the high power end of said reactor power demand.

4. A method as set forth in claim 3 wherein said control range of coolant temperatures has a constant temperature lower limit over the middle and high power end of said reactor power demand.

5. A method as set forth in claim 4 wherein said step of switching control is done whenever the required change in reactor power output is substantially in the range of five percent full power per minute.

6. A method as set forth in claim 5 wherein said step of switching control comprises the manual actuation of control signals preventing the movement of reactor control rods and enabling the variation of feedwater flow to decrease coolant temperature below said variable temperature set point.

7. A method as set forth in claim 6 further including the step of automatically switching reactor control back to said variable temperature set point control of the reactor control rods whenever reactor coolant average temperatures drop below the lower limit said range of coolant temperatures.

8. A method of controlling the power output of a nuclear reactor comprising the steps of:

providing an output signal indicative of required power output of the reactor;

converting said output signal into a reactor coolant temperature signal according to a predetermined function relating required power output to reactor coolant temperature wherein said function provides a substantially constant temperature for the middle range of reactor power output and a range of substantially decreasing temperatures for the high range of reactor power output;

providing a signal indicative of actual reactor coolant temperature;

comparing said converted output to said signal indicative of actual reactor coolant temperature to establish a control signal thereby; and utilizing said control signal to control the reactor power output.

9. A method as set forth in claim 8 wherein the control of the reactor power output utilizing said control signal is done by reactor control rod movement.

10. A method as set forth in claim 9 including the steps of:

providing a control range of temperatures below said variable temperature converted output signal; and switching control of the reactor from said variable temperature converted set point to said control range of temperatures.

11. A method as set forth in claim 10 wherein said step of switching control includes the steps of:

preventing reactor control rod movement; and allowing increased feedwater flow to increase reactor power output.

* * * * *